United States Patent [19]
Konicek
[11] 3,886,022
[45] May 27, 1975

[54] PROCESS FOR PEELING OFF AN ALUMINUM FOIL

[75] Inventor: Jiri K. Konicek, Perstorp, Sweden
[73] Assignee: Perstorp AB, Perstorp, Sweden

[22] Filed: May 24, 1974
[21] Appl. No.: 473,081

[30] Foreign Application Priority Data
June 20, 1973 Sweden ............ 73086530

[52] U.S. Cl. ............ 156/247; 156/344
[51] Int. Cl. ............ B32b 31/00
[58] Field of Search ......... 134/34, 41; 75/97; 156/3, 156/7, 233, 236, 247, 249, 344

[56] References Cited
UNITED STATES PATENTS

| | | | |
|---|---|---|---|
| 2,692,190 | 10/1954 | Pritikin | 156/3 X |
| 2,937,940 | 5/1960 | Weisberg et al. | 75/97 |
| 3,181,986 | 5/1965 | Pritikin | 156/247 X |

*Primary Examiner*—William A. Powell
*Attorney, Agent, or Firm*—Stevens, Davis, Miller & Mosher

[57] ABSTRACT

Process for peeling off an aluminum foil from a copper layer of a copper-clad, insulating base, which base is intended for the production of printed circuits. The process is characterized in that the peeling off is carried out below the surface of an aqueous solution or at a continuous supply of an aqueous solution on the boundary between the copper layer and the aluminum foil.

1 Claim, No Drawings

PROCESS FOR PEELING OFF AN ALUMINUM FOIL

The present invention relates to a process for peeling off an aluminum foil from a copper layer of a copper-clad, insulating base intended for the production of printed circuits.

A process for the production of bases covered with for example copper and intended for the production of printed circuits is described in the Belgian Pat. No. 788,117. According to said process a temporary base consisting of a thin foil for example of aluminum is used. The produced laminate is carrying the aluminum foil as a surface layer. Before the laminate can be used for the production of printed circuits, the aluminum foil must be removed from the copper layer situated below. It is mentioned in the above Belgian patent that the aluminum foil can be removed by peeling, dissolution or etching. It is preferable inter alia from an environmental point of view to peel off the foil. Of course it is preferred from the viewpoint of costs that the aluminum foil used is as thin as possible. At the peeling off, however, a thin foil bursts or splinters more easily than a thick one. The better the adherence is between the copper layer and the aluminum foil, the thicker aluminum foil must be used.

According to the present invention it has now surprisingly turned out to be possible to overcome the difficulties mentioned above. The invention relates to a process for peeling off an aluminum foil from a copper layer of a copper-clad, insulating base intended for the production of printed circuits. The process is characterized in that the peeling off is carried out below the surface of an aqueous solution or at a continuous supply of an aqueous solution on the boundary between the copper layer and the aluminum foil.

The insulating base consists preferably of a laminate of glassfibre reinforced epoxy resin. However, it is possible to use any base occurring within this field as the material of the base does not influence upon the process according to the invention.

According to the invention the adherence between the aluminum foil and the copper layer at the peeling off is decreased in a most remarkable way.

Thus, the adherence at a peeling off according to the invention is only a third to a fifth of the adherence existing at a peeling off without the presence of an aqueous solution.

The water in the aqueous solution is the active component for the decrease of the adherence between the copper layer and the aluminum foil. Therefore the aqueous solution usually consists of water only. Components of different kinds, which are inactive for the adherence, can be mixed into the water. Such additives can for example consist of salts or other solvents than water, such as acetone. It is also possible to add components into the water which protect the uncovered copper surface from oxidation or other damage.

Other polar or non-polar solvents, such as dimethylformamide (DMF), ethanol, or trichloroethylene, give none or just a slight decrease of the adherence between the two metal layers.

The invention is explained further in connection with the embodiment examples shown below, of which examples 1 to 4 relate to a process where the solvent was continuously dropped on the test sample in such a way that the boundary between the copper layer and the aluminum foil was covered, and examples 5 and 6 relate to a process where the test sample was completely immersed in water.

EXAMPLES 1 TO 6

A copper-clad, glassfibre reinforced epoxy laminate was produced according to the process described in the Belgian Pat. No. 788,117. The temporary base consisted of an aluminum foil which consequently constituted the surface layer of the produced laminate. Test samples having a size of 50 × 50 mm were sawn out of the laminate. Cuts were made through the aluminum layer in such a way that four strips having a width of 10 mm were obtained. The peel strength was measured on two strips of each test sample in order to obtain comparative values for a sample which had not been treated according to the invention. The comparison tests were all made without any solvent. The two remaining strips of each test sample were used for measuring the peel strength in the presence of a specified solvent. The following solvents were used in the different examples:

Example 1: Water (room temperature)
Example 2: DMF (room temperature)
Example 3: Ethanol (room temperature)
Example 4: Trichloroethylene (room temperature)
Example 5: Water (50°C)
Example 6: Water (90°C)

At the measuring of the peel strength (lb/in) between the copper layer and the aluminum foil the following values were obtained in the different examples.

| | | |
|---|---|---|
| Example 1: | Comparison tests | 1.4 and 1.5 lb/in |
| | Water | 0.3 and 0.3 lb/in |
| Example 2: | Comparison tests | 1.1 and 1.3 lb/in |
| | DMF | 1.1 and 1.1 lb/in |
| Example 3: | Comparison tests | 1.3 and 1.1 lb/in |
| | Ethanol | 1.1 and 1.0 lb/in |
| Example 4: | Comparison tests | 1.3 and 1.8 lb/in |
| | Trichloroethylene | 1.9 and 2.0 lb/in |
| Example 5: | Comparison tests | 1.1 and 1.1 lb/in |
| | Water, 50°C | 0.3 and 0.3 lb/in |
| Example 6: | Comparison tests | 0.8 and 0.9 lb/in |
| | Water, 90°C | 0.2 and 0.3 lb/in |

The result shows that the water gives a very favourable effect in respect of the adherence, while the other solvents do not give such an effect.

The invention is not restricted to the embodiment examples shown as these can be modified in different ways within the scope of the present invention.

I claim:

1. Process for peeling off an aluminum foil from a copper layer of a copper-clad, insulating base intended for the production of printed circuits, characterized in that the peeling off is carried out below the surface of an aqueous solution or at a continuous supply of an aqueous solution on the boundary between the copper layer and the aluminum foil.

* * * * *